Patented May 14, 1940

2,200,850

UNITED STATES PATENT OFFICE 2,200,850

FLAMEPROOFING SPONGE RUBBER AND METHOD OF FLAMEPROOFING

Charles O. Miserentino, Buffalo, N. Y., assignor to Dunlop Tire and Rubber Corporation, Buffalo, N. Y., a corporation of New York No Drawing. Application August 27, 1938, Serial No. 227,059

6 Claims. (Cl. 91—68)

My invention relates to a porous or cellular rubber, such as that made from foamed rubber latex, resistant to flame or fire, and to the method of rendering such porous or cellular rubber flame-resistant.

Heretofore porous or cellular rubber has been rendered flame-resistant or fireproof by coating the surfaces of the cells or pores with certain inorganic compounds as described, for example, in Twiss Patent No. 1,966,271. In this process a flameproofing material, such as ammonium chloride, ammonium sulphite, selenium or silicofluoride, or similar material, was dissolved or suspended in a liquid into which the porous or cellular rubber structure was then immersed so as to fill the pores with the liquid solution or suspension.

Upon removing the porous structure and squeezing out the greater part of the solution a film was left on the surfaces of the pores, which on drying, left a coating of the fireproofing or fire-resisting material. Other fireproofing or fire-resisting materials are ammonium phosphate, sodium phosphate, borax, boric acid, and ammonium bromide. As disclosed in said Twiss patent, other materials such as casein or rubber, could be added to hold the inorganic materials in a film after drying. The fire resistance of porous or cellular rubber, treated as outlined above, is greatly increased but the treatment has a tendency to stiffen the porous or cellular rubber and to give it other undesired physical characteristics such, for example, as result from the formation of salt agglomerates.

In my present invention, I provide a flame-resistant or flameproof porous rubber and a method of treating flameproof or flame-resistant porous or cellular rubber so as to increase or maintain the resistance to flame while also restoring or maintaining the flexibility, resiliency and texture of the original unproofed porous material.

In my present invention, the porous or cellular rubber article or structure is treated with any one or more of the organic flame repellant compounds, such as those mentioned above, or equivalent materials, and with an alcohol soluble chlorinated hydrocarbon. The cellular material may be treated with an inorganic fireproofing material and the chlorinated hydrocarbon in any suitable manner so as to leave a film of chlorinated hydrocarbon on the pore or cell wall that has been coated with the inorganic material. This is most conveniently accomplished by first coating the cell or pore surface with the inorganic material and then immersing the structure in a solution of the chlorinated hydrocarbon in alcohol, then squeezing out the excess and drying so as to leave a thin deposit of the chlorinated hydrocarbon on the previously deposited film of inorganic material. This restores or preserves the original texture, resiliency and softness of the cellular or porous rubber. A cellular or porous rubber such as that resulting from a foamed rubber latex, therefore, has the surfaces of the pores throughout the material coated with an inorganic fireproofing material and also with the chlorinated hydrocarbon which is also fire resistant or fire repellant.

An example of an alcohol soluble chlorinated hydrocarbon is chlorinated diphenyl, commonly known as "Aroclor." It will be understood that the solvent for the chlorinated diphenyl or aroclor being an alcohol is not a solvent for either rubber or the inorganic salts and therefore does not in any way affect the latter. Where the porous or cellular rubber is vulcanized wet, the vulcanized goods may be treated with the inorganic fireproofing material while still wet, then after being squeezed, drained or centrifuged and dried, is treated with the alcohol solution or aroclor or chlorinated diphenyl. A treatment in which from 20% to 30% by weight of dry ammonium chloride is incorporated in the porous or cellular rubber followed by a treatment with a 5% solution of aroclor and alcohol and subsequent squeezing, draining or centrifuging so that the rubber thus wet with the solution has gained 5% in weight, is generally sufficient.

An example of the process is as follows: A sponge rubber, such as that formed from foamed latex, is soaked in a solution of 25 parts of ammonium chloride and 75 parts of water, and the excess squeezed out until the gain in weight of the "wet" treated material is 133% of the dry weight of the cellular rubber. The material is then dried in a current of warm air and upon drying is then soaked in a solution of 5 parts of aroclor by weight in 95 parts of alcohol and the excess squeezed out until the net gain in weight is 105% on the dry weight. The article is again dried in a current of warm air.

Sponge rubber treated according to my invention does not burn unless held continuously in a flame and on withdrawal from the flame immediately ceases to burn. At the same time it has the texture, softness and other properties of an untreated cellular or porous rubber.

Various modifications may be made by those skilled in the art without departing from the invention as defined in the following claims.

What I claim is:

1. A cellular porous rubber article having its internal pore surfaces covered with a fireproofing inorganic compound and a coating of chlorinated diphenyl.

2. A cellular porous rubber article having its internal pore surfaces covered with a fireproofing inorganic compound and a coating of chlorinated diphenyl, said inorganic fireproofing material constituting between 20% to 30% of the weight of the article.

3. A cellular porous rubber article having its internal pore surfaces covered with a fireproofing inorganic compound and a coating of chlorinated diphenyl, said inorganic fireproofing material constituting between 20% to 30% of the weight of the article, and the chlorinated diphenyl constituting less than 1% of the weight of the porous structure.

4. A foamed latex rubber structure having the internal surfaces of its pores coated with an inorganic fireproofing material and chlorinated diphenyl the chlorinated diphenyl constituting less than 1% of the weight of said article.

5. A process for fireproofing cellular rubber material which comprises depositing on the surfaces of the cells of said article a deposit of an inorganic fireproofing material and a coating of chlorinated diphenyl insufficient to fill said cells.

6. The process of fireproofing cellular rubber structures which comprises first immersing said structure in a liquid containing inorganic fireproofing material, squeezing out the excess of said material to leave the surfaces of the cells wet therewith, drying said structure, immersing it in an alcoholic solution of chlorinated diphenyl, squeezing out the excess of chlorinated diphenyl solution to leave a coating of the alcoholic chlorinated diphenyl solution and to leave the cells open and thereafter drying the resulting structure.

CHARLES O. MISERENTINO.